United States Patent [19]
Pfister

[11] 4,047,317
[45] Sept. 13, 1977

[54] FISH LURE

[75] Inventor: William H. Pfister, Livingston, N.J.

[73] Assignee: William R. Pfister, Point Pleasant, N.J.

[21] Appl. No.: 658,696

[22] Filed: Feb. 17, 1976

[51] Int. Cl.² ................................................ A01K 97/04
[52] U.S. Cl. ..................................................... 43/42.06
[58] Field of Search ............................ 43/42.06, 41, 41.2

[56] References Cited

U.S. PATENT DOCUMENTS

| 2,091,457 | 8/1937 | Sauer | 43/42.06 |
| 2,181,317 | 11/1939 | Fernstrom | 43/43.12 |
| 3,190,028 | 6/1965 | Mambrin | 43/41.2 |
| 3,748,772 | 7/1973 | Gravitt | 43/41 |

Primary Examiner—Warner H. Camp
Attorney, Agent, or Firm—Albert F. Kronman

[57] ABSTRACT

A fish lure having a hollow body portion formed of complimentary shells pivotally secured together at one end is provided with a fish attracting scent material carried within the lure body. Openings in the lure body are provided at each end to permit water to enter and leave the lure cavity as the lure is pulled through the water, thereby dispersing the scent. A latch cooperating with a hook securing means permits easy access to the lure cavity while holding the shells together while fishing.

4 Claims, 5 Drawing Figures

FISH LURE

BACKGROUND OF THE INVENTION

Fish lures of many types have been devised and used in connection with fishing. Some of the lures are designed to attract fish because of a resemblance to other smaller fish, insects or other natural fish food. It has been found that lures having a distinctive scent are more successful in attracting fish than other types but it is difficult to maintain the scent in the vicinity of the hook for any length of time. Movement through the water quickly washes the scent away and the lure is rendered inoperative. It is the object of the present invention to provide a fish lure having a scent receiving and despersing body.

One of the features of the invention is a scent receiving enclosure formed between two separable shell-like body members. Small holes in the shells permit the scent to be dispersed gradually into the water.

Another feature of the invention is a latch means at the lower ends of the body shell members.

SUMMARY

The invention comprises a fish lure containing a scent producing material and includes a hollow body consisting of a first elongated shell-like member formed with a shallow cavity. The two shells are positioned opposite each other form the hollow body member within which there is contained the scent producing material. The two shells are swingably coupled together at their upper or line ends and latch structure consisting of a ring and slot combination secures a hook to the lower or hook end of one of the shells. The latch arrangment at the hook end of the shells serves to lock the two shell members together for fishing purposes, while affording easy access to the body enclosure.

Additional details of the invention will be disclosed in the following description, taken in connection with the accompanying drawings.

DESCRIPTION OF THE PREFERRED EMBODIMENT

Figure 1:
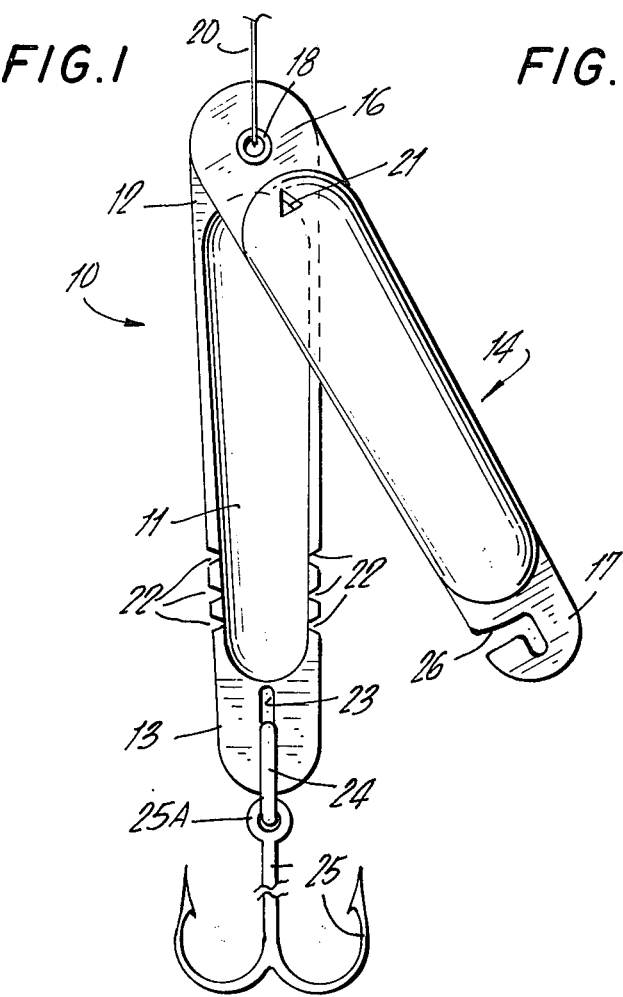
FIG. 1 is a side view of the fish lure with the two body portions separated to receive a scent producing material therebetween.
Figure 2:
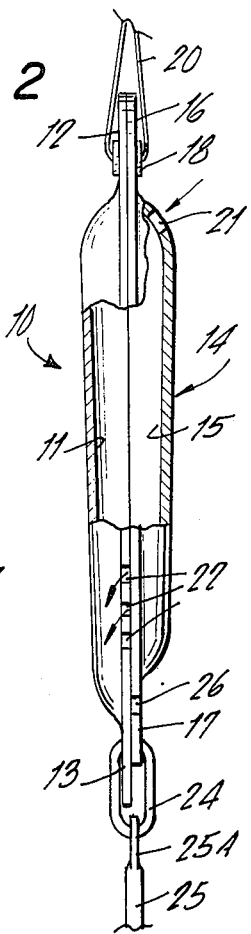
FIG. 2 is a side view of the fish lure, with some parts in section, showing the two body portions in the closed position.
Figure 3:
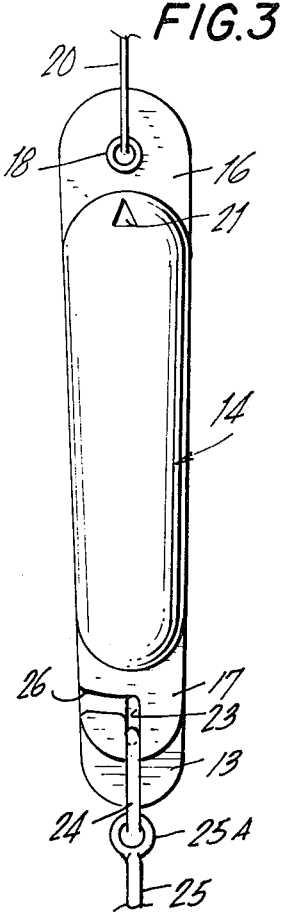
FIG. 3 is a side view similar to FIG. 2 but showing the members joined.

Referring now to FIGS. 1, 2 and 3 the fish lure comprise a body 9 having a first elongated shell-like member 10, formed with a shallow cavity 11. A second shell-like member 14 is formed in a manner similar to the first member 10 having a shallow cavity 15. Each shell 10, 14 is formed with upper and lower flange portions 12, 13, 16 and 17 for a hereinafter more fully described purpose. As shown in FIG. 2, the two shells 10 and 14 are positioned opposite each other in closed position with cavities 11 and 15 disposed so as to form an enclosure for holding scent producing material (not shown). The two upper flanges 12 and 16 are swingably joined by a hollow rivet 18, this being the preferred form since it joins the two members and also forms a hole through which a fish line 20 can be attached. Other forms of fastenings, such as a nut and bolt, solid rivet, or snap fastener can be used.

As shown in FIGS. 1 and 2, the second shell 14 is formed with a small hole 21 near the top or line receiving end thereof where water can enter the lure body enclosure when the lure is immersed during fishing. The first shell 10 is formed with a plurality of notches 22 cut in the cavity 11 edges. The water which enters the lure body enclosure can seep through these notches quite slowly to discharge the scent which is usually of an oily nature. The direction of the water flow is indicated by the arrows adjacent to the holes.

Figure 4:
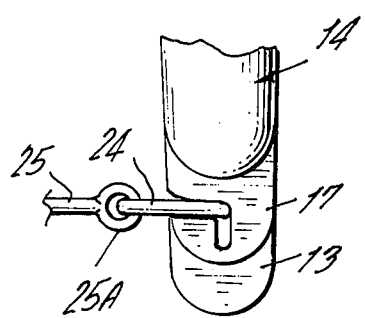
FIG. 4 is a fragmentary side view of the lower ends of the body portion showing one step in the operation of the latch.
Figure 5:
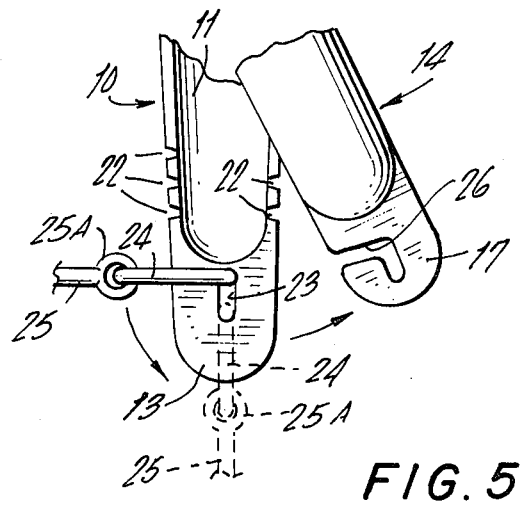
FIG. 5 is a side view similar to FIG. 4, showing a second step in separating the lure body portions.

At the bottom of the first shell 10, in its flange 13 an elongated slot 23 is formed to receive an oval ring 24 of metal which, in turn, supports a conventional fish hook 25. The oval ring 24 is made so that it and the fish hook eye 25A cannot be moved up to free the shells from their closed position unless the ring 24 is swung to one side as shown in FIGS. 4 and 5.

The lower end 17 of the second shell 14 is formed with an L-shaped slot 26, the vertical portion of this slot overlying slot 24 in flange 13 when the lure is closed. The horizontal portion of the L-shaped slot 26 is open ended to permit a fisherman to separate the two members when filling or cleaning the two cavities 11 and 15. The combined slots 23, 26 and ring 24 form a latch assembly for the shells 10, 14.

The operation of this lure is as follows: The two shells 10, 14 are separated as shown in FIG. 1 when the lure is to be filled by a scent producing material. The material is placed in cavity 11 and the oval ring 24 and hook eye 25A are swung to the left as shown in FIGS. 4 and 5. Then the shell 14 is moved to the closed position as the open-ended slot 26 engages the upper portion of the oval ring 24. When in the closed position, ring 24 and hook 25 are first lowered in both slots 26 and 23 and the ring and hook are moved to their vertical position as shown in FIG. 3. This is the latched or fishing position and the lure is ready for use. When the lure is pulled through the water a small portion of fluid enters hole 21 passes around and through the scent material and leaves notches 22 thereby spreading the scent producing material.

Any type of scent producing material can be used in this lure, including blood, fish oil, artificial scent or chopped fish parts or certain types of chemicals. When liquids are used, a piece of felt or a sponge is saturated with the liquid and then placed in the cavities.

Having thus fully described the invention, what is claimed as new and desired to be secured by Letters Patent of the United States is;

1. A fish lure containing fish attracting scent material comprising: a body portion including opposed first and second elongated shell-like members each formed with a shallow cavity, the said cavities forming an enclosure for holding the scent material; means for swingably securing the two members to each other at one end; latch means comprising a ring and a slot combination at the opposite end of each of the shell-like members for releasably securing the shell-like members, said slot consisting of an L-shaped slot having an open end formed in one of the shell-like members and an elongated closed slot formed in the other shell-like member movably retaining said ring member therein for cooperation with said L-shaped slot to lock the two lower ends of the members together, and the ring is oval shaped, and a fish hook secured at one end to the ring.

2. A fish lure according to claim 1 wherein said means for swingably securing the upper ends of the members is a tubular rivet.

3. A fish lure according to claim 1 wherein at least one hole is formed at each end of the shell-like members to let the water into and out of the cavity thereby creating a flow of water through the closed space to distribute the scent into the surrounding water.

4. A fish lure according to claim 1 including an absorbent material, saturated with a fish attracting scent producing liquid positioned in said cavities.

* * * * *